United States Patent [19]

Resetar

[11] 4,397,432
[45] Aug. 9, 1983

[54] ADJUSTABLE LITTER SUPPORT ASSEMBLY

[75] Inventor: Michael C. Resetar, Renton, Wash.

[73] Assignee: The Boeing Company, Seattle, Wash.

[21] Appl. No.: 269,179

[22] Filed: Jun. 2, 1981

[51] Int. Cl.$^3$ ............................................. B64D 11/00
[52] U.S. Cl. ........................................ 244/118.6; 5/8;
    211/193; 248/243; 244/137 P; 296/19
[58] Field of Search .............. 244/118.1, 118.5, 118.6,
    244/137 P; 248/240, 243, 240.4, 293; 410/51,
    52, 55, 71–77, 84, 89, 90, 94, 96; 211/192, 193,
    208; 296/19; 5/8, 9 R, 9 B, 82 R, 118

[56] References Cited

U.S. PATENT DOCUMENTS

| | | | |
|---|---|---|---|
| 2,473,364 | 6/1949 | Dickinson et al. | 244/118.6 |
| 3,358,300 | 12/1967 | Smith | 5/8 |
| 3,747,777 | 7/1973 | Kane | 211/193 |
| 3,783,320 | 1/1974 | Clement | 248/243 |
| 3,942,904 | 3/1976 | Morris | 211/208 |

FOREIGN PATENT DOCUMENTS 479035   2/1916   France ................................. 296/19

Primary Examiner—Charles E. Frankfort
Attorney, Agent, or Firm—Ronald E. Suter; Bernard A. Donahue; Randall M. Heald

[57] ABSTRACT

An adjustable litter support assembly includes fittings on each stanchion to engage conventional hold-down fixtures on the floor of an aircraft. The stanchions are further supported by interconnectable connecting links carried near the top of each stanchion. Connecting straps also extend from near the top of each stanchion to a floor fitting near the bottom of the other stanchion of each pair. Litter support arms are adjustably connected to each stanchion and carry locking straps for detachably holding a litter thereon.

14 Claims, 8 Drawing Figures

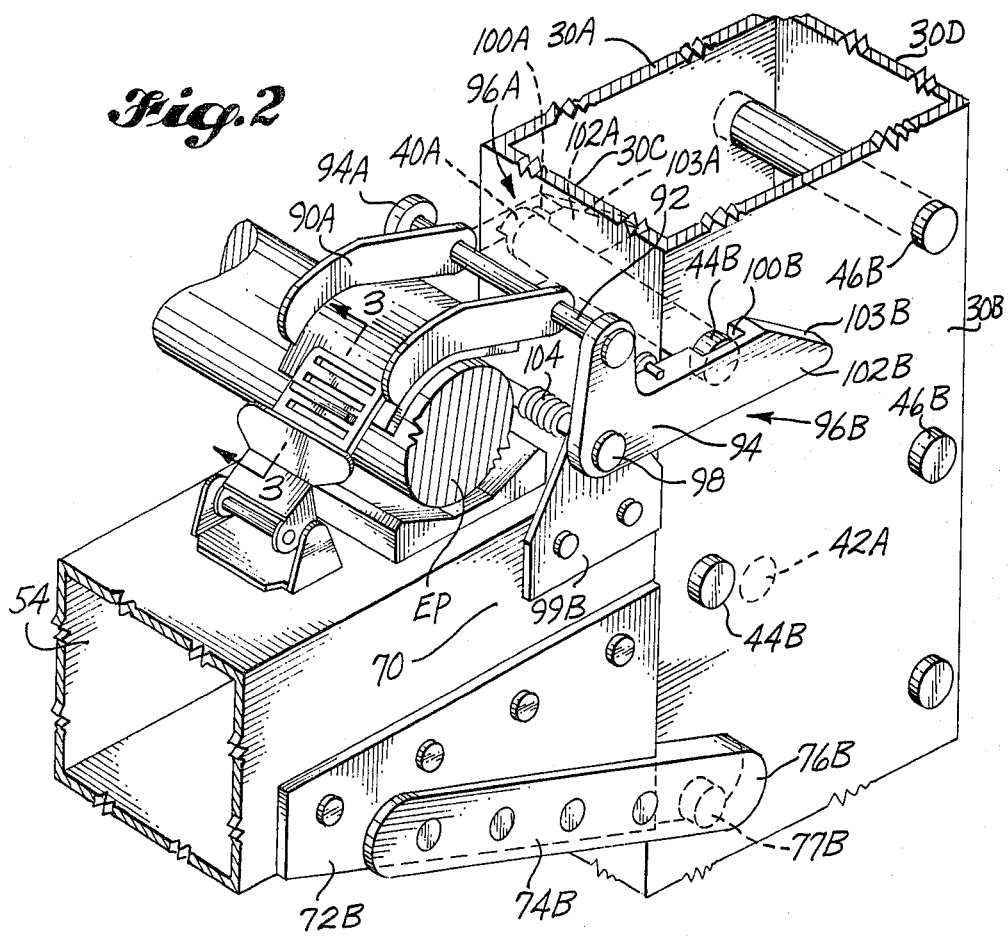
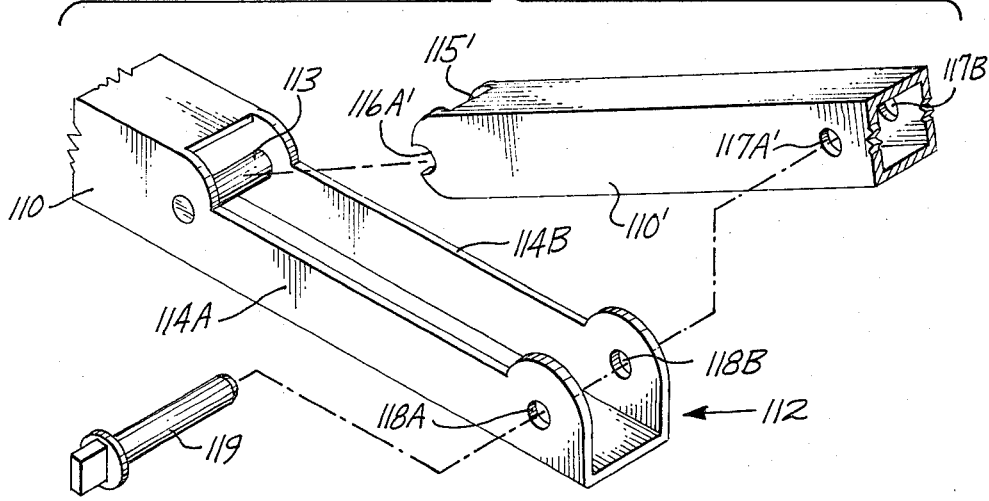

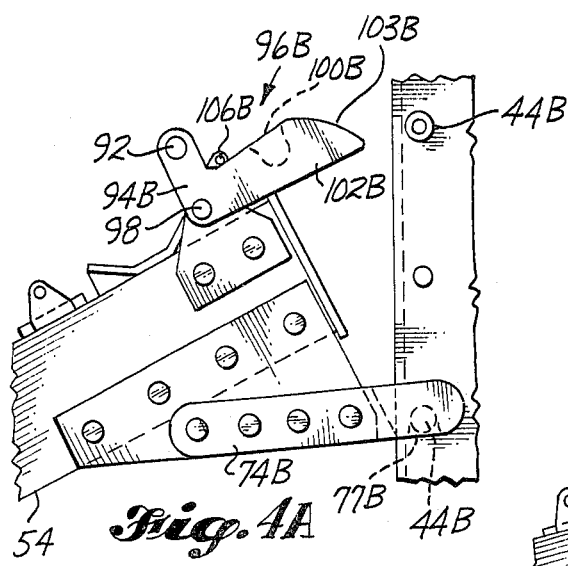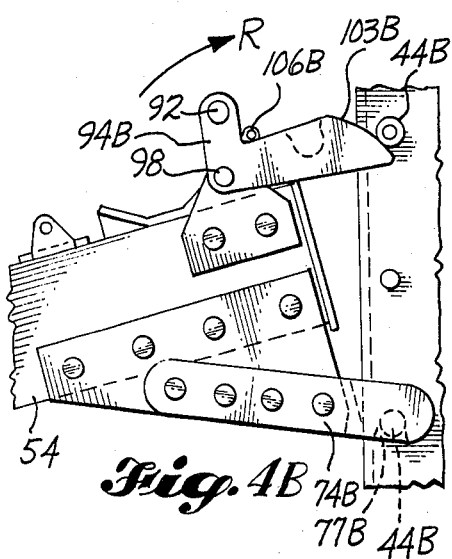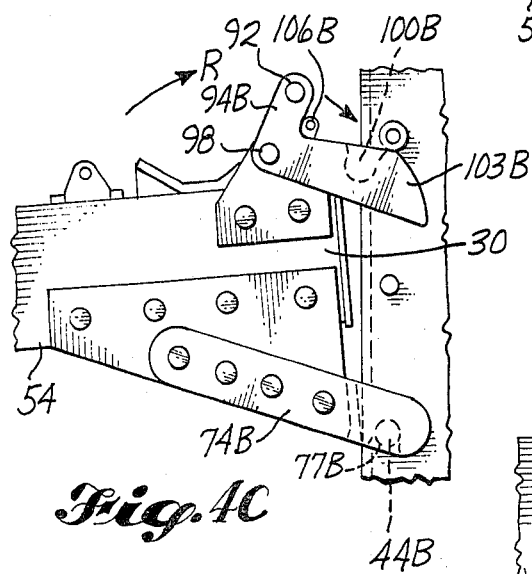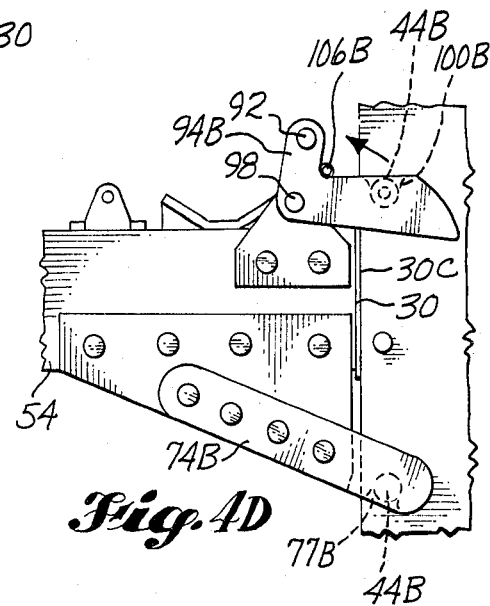

ADJUSTABLE LITTER SUPPORT ASSEMBLY

DESCRIPTION

Technical Field

The present invention is directed to an adjustable litter support assembly for use in transporting patients aboard cargo aircraft or the like.

BACKGROUND ART

In order to receive proper medical attention, it is often necessary to quickly transport patients extended distances to pre-selected treatment centers especially equipped to handle such patients. Because of their ability to cover large distances in relatively short periods of time, aircraft have proven especially valuable in transporting patients. For example, it is known that cargo aircraft can be employed for evacuating injured military personnel. Similarly, medivac helicopters are becoming increasingly useful in transporting crash and burn victims from accident sites to specialized treatment centers. However, a problems exists of how to safely transport large numbers of seriously wounded personnel on board such aircraft.

It has been suggested that a plurality of spaced ceiling to floor support straps be provided for supporting end portions of vertically stacked medical litters. While such a scheme may be used in small aircraft, it is impractical, to say the least, for use in larger cargo aircraft necessary for quickly transporting large numbers of patients.

It has further been suggested that a plurality of litters be supported at opposite ends by a pair of spaced support assemblies each secured to the aircraft floor by a minimum of at least two cables or struts. Such support assemblies are generally complex in nature and often require a number of persons to erect the support assemblies, making it difficult to quickly set up and rearrange the supports as may be required for emergency evacuations. A further, crucial drawback of many known litter support assemblies in a general inability to quickly adjust vertical spacing between a plurality of medical litters to accommodate additional litters, and/or necessary movement of injured personnel resting on the litters.

As will become apparent, the present invention provides a lightweight, free-standing litter support assembly easily assembled and positioned by a single person so as to overcome the types of problems discussed hereabove. In addition, the present invention provides an adjustable litter support assembly wherein spacing between vertically stacked litters can be easily and quickly varied in order to add or remove litters as required.

DESCRIPTION OF THE INVENTION

The present invention relates to an improved litter support assembly for use in supporting at least one litter during airborne transport or the like. Preferably, the litter support assembly of the present invention provides support for a number of vertically stacked litters. The litter support assembly includes a pair of spaced support stand assemblies, each stand assembly including a base portion resting on a floor of the aircraft and an attached, upright portion extending upwardly from the base portion in a direction substantially perpendicular to the aircraft floor. Each upright portion includes a plurality of vertically spaced attachment means extending outwardly from opposite sides thereof. At least one support arm, and preferably a plurality of separate, vertically spaced support arms extend outwardly from each upright portion. Each support arm includes at least one locking assembly for securing a litter and a coupling assembly for pivotally engaging a pair of attachment means, allowing the support arm to pivot to a fully extended position prior to actuation of the locking assembly. Each support arm further includes engagement means detachably engaging a further pair of attachment means responsive to actuation of the locking assembly to prevent each support arm from pivoting relative to its attached upright portion even with a loaded medical litter resting thereon.

When assemblied, each medical litter extends between and rests on a pair of horizontally extending support arms attached to separate upright portions. Additional locking means are preferably mounted on opposite end portions of one or more of the support arms to aid in locking each litter in place. Connecting links attached to each upright portion are joined in end to end relationship to one another to stabilize the support assembly. Each support stand assembly also preferably includes a tie down strap extending from an upright portion to a floor mounted fastener located adjacent a remaining upright portion spaced therefrom. Finally, each base portion preferably includes at least one fitting selectively engageable with various fittings arranged at regular intervals in the floor of the aircraft or the like.

While the present invention is especially valuable in transporting litters aboard cargo aircraft, it is respectfully noted that the present invention is adaptable for use in almost any type of vehicle used in transporting medical litters. Furthermore, the present invention is not limited to use only during transport of medical litters, rather, the adjustable litter support assembly may be of invaluable assistance anywhere it is required to support one or more medical litters, as in field hospitals temporarily erected at rescue sites.

BRIEF DESCRIPTION OF THE DRAWINGS

A preferred embodiment of the present invention will be described in detail in the following portions of the specification. The detailed explanation is to be read in conjunction with the attached drawings in which like reference numerals identify identical apparatus, and in which:

FIG. 2 shows a blown-up view of a locking assembly employed in the embodiment of FIG. 1;

FIGS. 4A–4D show the locking assembly of FIG. 2 in various orientations achieved as the locking assembly is pivoted from a detached position shown in FIG. 4A to an attached position shown in FIG. 4D; and FIG. 5 is a blown-up view of the stand locking assembly employed in attaching the upright stand members to one another.

BEST MODE FOR CARRYING OUT THE INVENTION

Referring to the accompanying drawings, an improved litter support assembly is generally designated at 10 as resting on a conventional floor F of a cargo aircraft or the like. Floor F conveniently includes a plurality of evenly spaced tie-down fittings 12 to provide points of engagement for conventional cargo straps or the like. Such tie-down fittings 12 usually include one or more hooks H each pivotally mounted within a separate opening formed in floor F. However, the conventional pivoting hooks H may be replaced with any type of conventional tie-down fitting, such as standard seat track compatible fittings. While the fittings 12 provide no part of the present invention itself, they do provide a convenient means for securing litter support assembly 10 in place on floor F.

Figure 1:
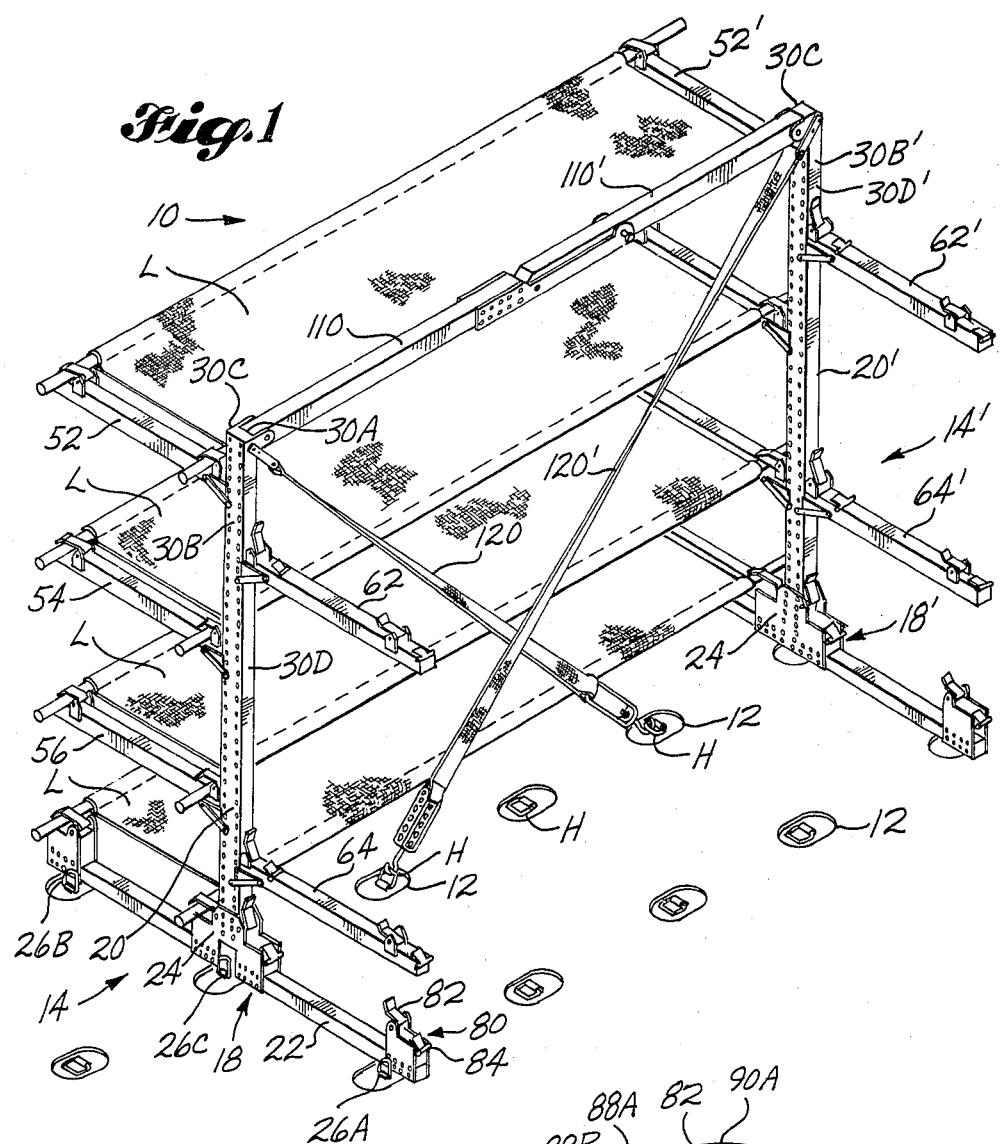
FIG. 1 is a perspective view of adjustable litter support assembly constructed in accordance with a preferred embodiment of the present invention.

As shown in FIG. 1, litter support assembly 10 includes a pair of separate support stands 14 and 14', respectively. Because each support stand is preferably identical in structure to the remaining support stand, a detailed description of support stand 14 is believed to be sufficient to provide a proper understanding of support stand 14'. However, while stand 14' is similar to support stand 14, the components forming support stand 14' have been given a prime "'" designation in order to clearly differentiate from the components forming support stand 14.

Support stand 14 includes a base assembly 18 and an attached, upright member 20 forming a substantially perpendicular angle with a longitudinal axis through base assembly 18. Support stand 14 has a substantially inverted T configuration, with base assembly 18 resting on floor F and upright member 20 extending in a substantially vertical direction perpendicular to floor F. In a similar manner, support stand 14' has a base assembly 18' and an upright member 20' attached thereto. When assembled, base assemblies 18 and 18' extend substantially parallel to one another and upright members 20 and 20' also extend substantially parallel to one another.

Base assembly 18 includes a leg assembly 22 extending outwardly from opposite sides of a central bracket 24 which also receives a lower end of upright portion 20. Leg assembly 22 may comprise a single leg member extending completely through and beyond central bracket 24 or a pair of separate leg members extending outwardly from opposite sides of bracket 24. In either case, leg assembly 22 rests on floor F and provides support for maintaining upright member 20 in its substantially vertical orientation relative to floor F. Leg assembly 22 includes a pair of flanges 26A and 26B mounted on opposite, outboard end portions remotely positioned from central bracket 24. Each of the flanges 26A and 26B includes a configuration compatible in size with openings in the various tie-down fittings 12 formed in floor F, with flanges 26A and 26B spaced along leg assembly 22 such that each flange simultaneously engages a separate fitting 12. Engagement between flanges 26A, 26B and a pair of fittings 12 prevents base assembly 18 from sliding or twisting on floor F. To prevent fore and aft rocking movement of base portion 18, an additional flange 26C is attached to central bracket 24 and positioned to engage a further fitting 12, with a hook H extending over and contacting flange 26C to prevent movement thereof.

Each upright portion 20 and 20' extends into an opening in one of the central brackets 24 and 24'. Each upright portion 20 and 20' preferably has a rectangular cross-sectional configuration for simultaneously supporting a plurality of separate medical litters L on each side of the upright portions 20 and 20' in a manner to be explained. However, it is considered within the scope of the present invention to employ upright portions of any conventional cross-section for supporting litters L only on one side, provided adequate support means are employed to compensate for any imbalance in weight.

As shown in FIG. 1, upright portion 20 includes a side 30A directly facing a parallel extending side 30A' of spaced upright portion 20'. Upright portion 20 further includes a parallel side 30B oppositely disposed from side 30A, while upright portion 20' also includes a parallel side 30B' oppositely disposed from side 30A'. Finally, upright portion 20 includes a pair of oppositely disposed, parallel extending sides 30C and 30D extending between and joining each of the opposite sides 30A and 30B. Likewise, identically constructed upright portion 20' also includes oppositely disposed, parallel extending sides 30C' and 30D' joining each of the sides 30A' and 30B', respectively.

Each upright portion 20 and 20' further includes attachment means for engaging one or more support arms extending outwardly from either upright portion in a manner to be explained. In particular, two substantially vertically disposed columns of separate attachment members 40A and 42A extend side-by-side from side 30A, while two aligned additional columns of separate attachment members 44B and 46B extend side-by-side from side 30B of upright portion 20. Preferably, each attachment member 40A is axially aligned with a separate attachment member 44B to form pairs of vertically spaced attachment members extending from opposite sides of upright portion 20. Likewise, each of the attachment members 42A is preferably axially aligned with a separate attachment member 46B to form additional pairs of vertically spaced attachment members extending from opposite sides of upright portion 20. Each pair of axially aligned attachment members 40A and 44B or 42A and 46B may be formed from a pair of separate studs extending outwardly from opposite sides of upright 20. Alternatively, each pair of axially aligned attachment members may comprise opposite end portions of a single stud extending through aligned apertures formed through sides 30A and 30B, respectively. In either case, pairs of attachment members are preferably aligned both vertically and horizontally with additional pairs of attachment members, thereby forming two columns extending side-by-side substantially the entire length of upright portion 20.

As will become clear, each pair of axially aligned attachment members provides a separate point of connection for mounting a support arm against one of the sides 30C or 30D, respectively, of upright portion 20. In FIG. 1, three separate support arms 52, 54 and 56 are each shown extending outwardly from side 30C of upright portion 20. Likewise, three additional support arms 52', 54' and 56' are each shown extending outwardly from side 30C' of upright portion 20'. Preferably, support arms 52, 54 and 56 extends parallel to corresponding support arms 52', 54' or 56' forming pairs of spaced support arms each capable of supporting a separate medical litter L extending therebetween. Additional support arms 62 and 64 are each shown extending outwardly from side 30D, with corresponding support arms 62' and 64' each extending outwardly from side 30D' of upright portion 20'. Each of the support arms 62 and 64 preferably extends parallel to a separate one of the support arms 62' or 64', forming additional pairs of support arms capable of supporting additional medical litters, not shown for purposes of clarity. The number of separate pairs of support arms extending from either side of upright portions 20 and 20' can be adjusted by merely adding or removing support arms as required. Likewise, the vertical spacing between support arms mounted on each side of each upright portion can be easily and quickly adjusted in a manner to be explained.

Referring to the blown-up section of upright portion 20 shown in FIG. 2, a plurality of vertically spaced attachment members 44B are each shown extending outwardly from side 30B. Attachment members 44B are preferably equally spaced from one another and positioned more closely to side 30C than to side 30D. In a like manner, attachment members 46B are shown in FIG. 2 as being evenly spaced from one another and positioned more closely to side 30D than to side 30C. Positioned adjacent to side 30C is an inboard end portion 70 of a typical support arm, such as support arm 54. Inboard end portion 70 includes a coupling assembly for pivotally joining support arm 54 to upright portion 20. In particular, a bracket 72B is fixedly attached to a side of inboard end portion 70 extending substantially coplanar to side 30B. Attached to bracket 72B is a flange 74B including an end 76B having a hook-shaped opening 77B formed therein. Opening 77B is of sufficient size to partially enclose and pivotally contact any of the attachment members 44B, each of which is of preferably cylindrical configuration. In a similar manner, an identical bracket and flange, not shown, are mounted on an opposite side of inboard end portion 70 adjacent side 30A to provide for pivotal engagement with a selective attachment member 40A aligned with the attachment member 44B engaging flange 74B. Each support arm can be vertically repositioned by merely aligning the hook-shaped openings 77A and 77B with any axially aligned pair of attachment members 40A, 44B. Because each opening 77A and 77B is preferably hook-shaped, flanges 74A and 74B can be moved adjacent sides 30A and 30B until openings 77A and 77B partially surround and contact any pre-selected pair of attachment members 40A, 44B.

Figure 3:
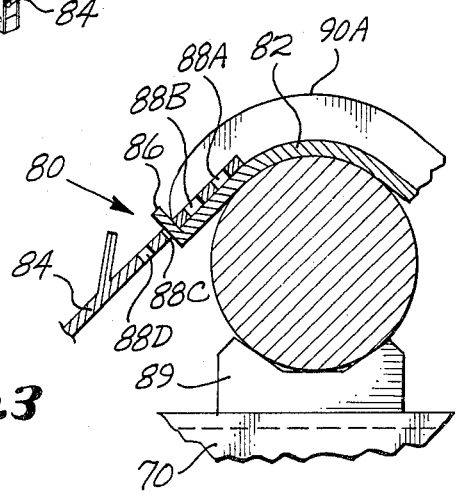
FIG. 3 shows a cross-section taken along the plane A—A in FIG. 2.

Each medical litter L usually includes a pair of parallel extending support poles and a layer of canvas or the like extending therebetween. By carefully positioning upright portions 20 and 20', it becomes possible to rest opposite end portions EP of each pair of support poles on a pair of parallel extending support arms attached to and extending perpendicular from upright portions 20 and 20'. In order to prevent the medical litters L from accidently moving from their pre-selected rest positioned, at least one and preferably both support arms supporting each litter L include a similar over-center locking assembly 80. As shown in FIGS. 2 and 3, a locking assembly 80 is positioned on a vertically upper surface of inboard end portion 70 facing away from base portion 18. A further locking assembly 80 may be positioned on an outboard end of at least one and preferably each support arm supporting the litter L.

Each locking assembly 80 is of the over-center type and includes a pair of strap members 82 and 84 each pivotally attached to spaced portions of the inboard end 70. Either of the strap members may include a plurality of apertures for receiving a fastening member attached to the remaining strap member, with the attached strap members partially surrounding an end portion EP of a litter support pole. The strap members act to clamp the support pole into engagement with the support arm to prevent accidental movement of the litter. In a preferred embodiment, strap member 82 includes a curved end portion 86 adaptable for insertion through one of a plurality of openings 88A, B, etc., formed in strap 84 in order to clamp the end portion EP of the support pole into engagement with a cradle 89 mounted on inboard end 70 between strap members 82 and 84. In a like manner, each locking assembly mounted on an outboard end of a support arm also includes a pair of pivotally attached straps 82 and 84 arranged to surround and clamp an end portion EP of a further pole of the litter L.

Strap member 82 is preferably attached to a pair of substantially parallel extending support bars 90A and 90B, respectively. The support bars preferably include curved surface portions adaptable for resting on the curved surface of the litter pole end portion EP as best shown in FIG. 2. Support bars 90A and 90B include aligned openings formed through end portions remotely positioned from strap member 82. A pin member 92 extends through the aligned openings and is journalled in a pair of substantially L-shaped crank members 96A and 96B positioned on opposite sides of support bars 90A and 90B. Crank members 96A and 96B are each mounted on a further pin 98 extending therebetween, with pin 98 also journalled in a pair of brackets 99A, not shown, and 99B rigidly attached to opposite sides of inboard end portion 70.

Crank members 96A and 96B include arm portions 94A, 102A and 94B, 102B, respectively, with each arm position 94A and 94B extending substantially perpendicular to its respectively attached arm portion 102A or 102B. A hook-shaped opening 100A is formed in arm portion 102A, while a further hook-shaped opening 100B is formed in a portion of arm portion 102B preferably aligned with opening 100A. Preferably, each opening 100A and 100B is remotely positioned from a respective arm portion 94A or 94B. Furthermore, each arm portion 102A and 102B includes an inclined end surface 103A and 103B, respectively. Each inclined end surface extends from a respective hook-shaped opening to a furthermost end portion of said arm portion 102A or 102B, respectively and each inclined surface 103A and 103B is formed on a side of its crank member facing away from a respective flange 74A or 74B. Finally, a helically-shaped biasing spring 104 is tightly wrapped about pin 98 and includes an end portion 106B projecting into an opening formed between the arm portions 94B and 102B of crank member 96B. In a like manner, spring 104 also includes an end portion 106A, not shown, which projects between arm portions 94A and 102A of crank member 96A.

Referring now to FIGS. 4A–4D, a method of assembling the support arms will now be explained in detail. FIG. 4A shows a typical support arm 54 which is initially moved toward upright member 20 until a portion of flange 74B extends adjacent to side 30B. At the same time, a flange attached to the opposite side of support arm 54, not shown, will extend adjacent to side 30A of upright member 20. Support arm 54 is then moved in a generally downward direction until hook-shaped opening 77B partially surrounds an attachment member 44B. Simultaneously, a hook-shaped opening formed in the flange attached to the opposite side of support arm 54, not shown, partially surrounds an attachment member 40A aligned with the attachment member 44B engaging flange 74B.

Because each of the flanges 74A and 74B pivotally engage attachment members extending from sides 30A and 30B, support arm 54 can now be pivoted with respect to upright member 20. Support arm 54 is pivoted in a clockwise direction, as shown by arrow R, from its initial engagement position shown in FIG. 4A to an intermediate position as shown in FIG. 4B. As support arm 54 reaches the position indicated in FIG. 4B, the inclined surface 103B of crank member 96B engages an attachment member 44B positioned vertically above the attachment member 44B projecting into opening 77B.

Further movement of support arm 54 in the clockwise direction of arrow R causes inclined surface 103B to press against attachment member 44B with a force sufficient to pivot crank member 96B in a clockwise direction about an axis through pin 98. It is noted that crank member 96A, not shown in FIG. 4B, simultaneously pivots about pin 98 as its inclined surface presses against an attachment member 40A. Pivoting movement of crank member 96B is resisted by the end portion 106B of biasing spring 104. However, when a sufficient pivoting force is imparted to crank member 96B from support arm 54, the resistance of spring 104 is overcome, resulting in the clockwise pivoting movement of crank 96B as discussed hereabove.

Continued clockwise rotation of support arm 54 eventually causes inclined surface 103B to move completely beneath attachment member 44B as shown in FIG. 4C. At this point, the end portion 106B of spring 104 is displaced through contact with arm portion 94B of crank 96B, with spring end portion 106B attempting to return crank member 96B to its original orientation. By rotating support arm 54 a further distance in the clockwise direction, the engagement position of support arm 54 is achieved as shown in FIG. 4D. At this point, the hook-shaped opening 100B is substantially vertically aligned with the attachment member 44B, and the inboard end portion 70 of support arm 54 is positioned adjacent to side 30C of upright member 20, preventing further clockwise rotation of support arm 54. Spring 104 now acts to return crank member 96B to its original orientation by rotating the crank member in a counter-clockwise direction about the axis through pin member 98. This, in turn, causes opening 100B to partially surround attachment member 44B, locking crank member 96B against further movement. In a similar manner, the crank member 96A, not shown, mounted on the opposite side of support arm 54 from crank member 96B is also urged by spring 104 into engagement with an attachment member 40A. In order to remove support arm 54 from upright member 20, it is merely necessary to rotate each crank member 96A and 96B in a clockwise direction to separate the attachment members 40A and 44B from the hook-shaped openings.

It is evident that the L-shaped crank-members are only necessary for use with locking assemblies mounted on inboard end portions of the various support arms in order to prevent rotation of the support arms relative to their respective upright portions 20, 20'. With locking assemblies 80 mounted on outboard end portions of one or more support arms, it is only necessary that the strap members 82A and 84A each have an end portion pivotally attached to the support arm.

Referring to FIGS. 1 and 5, it is noted that a connecting link 110 is pivotally attached to upright member 20, while a separate connecting link 110' is pivotally attached to upright member 20'. Connecting link 110 includes a channel-shaped end portion 112 sufficiently wide so as to partially enclose an end portion of connecting link 110'. Connecting link 110 further includes a pivoting pin 113 extending between opposite side walls 114A and 114B of channel-shaped end portion 112. Preferably, pivoting pin 113 is spaced from an end surface of channel portion 112 in order for channel portion 112 to provide maximum support to connecting link 110'.

As shown in FIG. 5, connecting link 110' is preferably hollow in cross-section and includes an end surface 115' having a pair of grooves with only groove 116A' shown in FIG. 5. Each groove has a smoothly curved shape conforming in size and shape to the outer surface of pivoting pin 113 for a reason which will soon become clear. Connecting link 110' further includes a pair of aligned apertures 117A' and 117B' formed through opposite side walls. In a like manner, a pair of aligned apertures 118A and 118B are formed through the side walls 114A and 114B, respectively of channel-shaped end portion 112. A locking pin 119 having a diameter slightly less than the diameters of each of the apertures 117A', 117B', 118A and 118B has a length sufficient for insertion of locking pin 119 through all of apertures when aligned. Finally, a strap 120 extends between a vertically upper end of upright member 20 and a fitting hook H positioned adjacent support stand 14' and a further strap 120' extends between a vertically upper end of upright member 20' and a further fitting hook H positioned adjacent to support stand 14.

During assembly, each of the support stands 14 and 14' are spaced from and positioned parallel to one another. Connecting links 110 and 110' are pivoted toward one another until the grooves on the end of connecting link 110' engage pivoting pin 113 extending through channel-shaped end portion 112. Connecting links 110 and 110' are then pivoted until channel-shaped end portion 112 partially encloses and contacts link 110', forming a substantially linear link assembly between upright stands 14 and 14'. As links 110 and 110' approach their final, substantially end-to-end positions, upright members 20 and 20' are spread from one another at their vertically upper ends, thereby placing straps 120 and 120' in tension. Once links 110 and 110' achieve end-to-end alignment, locking pin 119 is then inserted through aligned apertures 117A', 118A, 117B' and 118B. At this point, the connecting links and straps function to stabilize litter support assembly 10 against outside forces.

The present invention is not intended to be limited to the embodiments described hereabove, rather, the present invention is only to be limited to the scope of the claims following hereafter.

What is claimed is:

1. An adjustable litter support assembly for use in supporting medical litters onboard cargo aircraft or the like, and comprising:

a pair of spaced support stand assemblies, each support stand assembly including a base portion resting on a floor of a cargo aircraft or the like and each support stand assembly further including an upright portion extending from said base portion in a direction substantially perpendicular to said floor;

each upright portion including a plurality of pairs of aligned attachment members vertically spaced from one another and extending outwardly from oppositely disposed sides of each upright portion, each upright portion further including a connecting link pivotally attached near the top thereof with at least one of said connecting links including means for detachably engaging the other connecting link to rigidly connect said upright portions against independent movement, and at least one connecting strap extending from near the top of each upright portion and engaging a fixture mounted in said aircraft floor near the base of the other upright portion;

at least one support arm extending outwardly from each upright portion for supporting a medical litter extending between and resting on each support arm;

said support arms each including locking means detachably clamping end portions of said medical litter against movement relative to said support arms and engagement means for detachably engaging two of said pairs of vertically spaced attachment members, said engagement means comprising a pair of flanges extending outwardly from an inboard end portion of each support arm, each said pair of flanges including hook-shaped end portions partially encircling a first pair of said pairs of aligned attachment members, and said engagement means further comprising a pair of spaced arms each attached to an inboard locking strap, said arms include hook-shaped end portions partially encircling a second pair of aligned attachment members spaced substantially vertically above said first pair, whereby said support arms are firmly maintained in an outwardly extended position relative to their respective upright portion.

2. A litter support assembly according to claim 1, wherein said means for detachably engaging comprises a channel-shaped bracket extending from said at least one connecting link when said links are disposed end-to-end, said means for detachably engaging further comprises a locking pin extending through aligned apertures in said channel-shaped bracket and said remaining connecting link and preventing said links from pivoting relative to one another.

3. A litter support assembly according to claim 1, wherein a plurality of first pairs of said vertically spaced support arms extend outwardly from each upright portion, with one support arm of each first pair extending from one of said upright portions and being horizontally aligned with the other support arm of said first pair extending from the other said remaining upright portion, each of said first pairs being capable of supporting a separate litter extending therebetween.

4. A litter support assembly according to claim 3, wherein a plurality of second pairs of said vertically spaced support arms extend outwardly from each upright portion in a direction opposite to said first plurality of vertically spaced support arms, with one support arm of each second pair extending from one of said upright portions and being horizontally aligned with the other support arm of said second pair extending from a remaining upright portion, each of said second pairs capable of supporting a separate litter extending therebetween.

5. A litter support assembly according to claim 1, wherein each pair of aligned attachment members includes a first attachment member extending outwardly from a side of said upright portion which extends parallel to said support arms, and each pair of attachment members further includes a second attachment member extending outwardly from an oppositely disposed side of said upright portion which also extends parallel to said support arms.

6. A litter support assembly according to claim 5, wherein each pair of aligned attachment members comprise opposite end portions of a continuous stud extending through a pair of aligned apertures extending through said oppositely disposed sides of each upright portion.

7. A litter support assembly according to claim 5, wherein further pairs of aligned attachment members horizontally spaced from and aligned with a corresponding pair of attachment members also extend outwardly from vertically spaced portions of the oppositely disposed sides of each upright portion.

8. A litter support assembly according to claim 1, wherein said locking means comprises at least a first pair of locking straps pivotally mounted on the inboard end of each support arm;

each of said first pair of locking straps partially enclosing an end portion of a medical litter and each first pair of locking straps detachably engaging one another to clamp said end portion against movement.

9. A litter support assembly according to claim 8, wherein said locking means further comprising second pairs of locking straps mounted on outboard end portions of each support arm.

10. A litter support assembly according to claim 9, wherein each pair of locking straps provides an over-center engagement assembly including a hook-shaped flange mounted in one locking strap of each pair and extending through one of a plurality of apertures formed in the other locking strap of said pair.

11. A litter support assembly according to claim 1, wherein one flange of each pair of flanges is attached to an opposite side of each respective support arm and extends substantially parallel to the other flange of said pair.

12. A litter support assembly according to claim 1, wherein said engagement means further comprises a spring member mounted on said assembly for biasing said pair of spaced arms into positions adjacent said second pair of attachment members as said support arm is pivoted to a fully extended position wherein a longitudinal axis of said support arm extends substantially perpendicular to a longitudinal axis of said adjacently disposed upright portion.

13. A litter support assembly according to claim 1, wherein each base portion includes a pair of leg portions extending outwardly from opposite sides of a central bracket, and each upright portion includes an end extending into an opening in the respective central bracket.

14. A litter support assembly according to claim 13, wherein each upright portion has a substantially rectangular configuration and each pair of leg portions comprise oppositely disposed ends of a separate leg member extending completely through each central bracket.

* * * * *